United States Patent [19]

Bone et al.

[11] Patent Number: 4,918,602
[45] Date of Patent: Apr. 17, 1990

[54] DATA PROCESSING SYSTEM AND METHOD

[75] Inventors: William K. Bone, Willowbrook; John M. Giannini, St. Charles, both of Ill.

[73] Assignee: Computer Associates International, Inc., Garden City, N.Y.

[21] Appl. No.: 73,815

[22] Filed: Jul. 15, 1987

[51] Int. Cl.⁴ ............................................... G06F 9/00
[52] U.S. Cl. ..................................... 364/401; 364/300
[58] Field of Search ............... 364/402, 403, 400, 401, 364/191–193, 300

[56] References Cited

U.S. PATENT DOCUMENTS

| | | | |
|---|---|---|---|
| 3,654,616 | 4/1972 | Dunne et al. | 364/193 |
| 4,607,327 | 8/1986 | Kishi et al. | 364/191 |
| 4,656,603 | 4/1987 | Dunn | 364/900 |
| 4,663,704 | 5/1987 | Johns et al. | 364/191 |
| 4,683,549 | 7/1987 | Takaki | 364/191 |
| 4,700,290 | 10/1987 | Ichikawa | 364/191 |
| 4,750,105 | 6/1988 | Ohkawa et al. | 364/191 |

*Primary Examiner*—Jerry Smith
*Assistant Examiner*—Kim Thanh Tbui
*Attorney, Agent, or Firm*—Stephen D. Kahn

[57] ABSTRACT

A system and method are disclosed for computer implementation of a plurality of diverse commercial functions, the system comprising a central processing unit (CPU), a first plurality of storage modules each individually addressable by the CPU and containing what is termed a "component subprocess", and a second plurality of storage modules, each also individually addressable by the CPU and containing what is termed a "log point". Planner interactive means are provided and furnished by the CPU from further storage of the system with menus for the planning of what are termed system "products". Such menus present for selection various components which can be implemented. Responsively to planner component selection, for each component selected by the planner, the CPU responds by displaying the component processes associated with such component and the planner accumulates desired products by selecting component processes. Again from system storage, the CPU furnishes, for display and selection, system log points, which are predefined conditions in a component process which collect transaction information. In providing products for use, the CPU obtains log points and component subprocess from storage in sequences according with the component processes of the products.

16 Claims, 6 Drawing Sheets

DATA PROCESSING SYSTEM AND METHOD

FIELD OF THE INVENTION

This invention relates generally to digital data processing and pertains more particularly to improved systems and methods for computer implementation of business functions.

BACKGROUND OF THE INVENTION

For over the past decade, improved efficiency in digital data management has been afforded by the use of integrated data management systems, such the the IDMS/R (integrated data management system/relational), available from Cullinet Software, Inc., the assignee of the subject application for patent.

In the use of the IDMS/R, certain logical rules are implemented in forming the data base. Thus, the data base planner first defines data elements and then relates the data elements to one another. The data elements are then grouped into records and the records are interrelated. The logical model is essentially what the user thinks the information or data looks like and how that information is ultimately depicted on the user's terminal or printed report. While the physical storage and accessing of the data base is completely transparent to the user, the relational model provides the interface from the data base to the user-desired and familiar two-dimensional data table.

The data tables derived from the database are customarily quite large and are inclusive of vast information not relevant to a given user inquiry. Through relational operators in the IDMS/R, such as SELECT, PROJECT and JOIN, and menu-driven data selection, the user may obtain information from a given table or select and combine information from plural tables.

Considering known use of the foregoing type of database and management system in a banking function, one area thereof may contain customer names and another area may contain account information. A junction record is reached by entry of customer name or account number by a teller and the junction record ties into the account information. Customary software (COBOL MOVE AND OBTAIN) retrieves data from the database. Application software then effects the banking function which may then be under implementation, such as, interest accrual and posting, deposit accumulation, withdrawal, etc.

In the systems heretofore provided by the assignee hereof employing the IDMS/R for effecting banking functions, application software has been provided specific to each banking task, for example, a software package for DDA (demand deposit accounts) management, a software package for retirement fund account management, and the like.

From applicants' viewpoint, such heretofore known banking systems based on the IDMS/R do not maximize benefits obtainable therefrom and are inefficient further in their requirements for separate applications software packages.

U.S. Pat. No. 4,346,442, entitled "Securities Brokerage-Cash Management System" and issued on Aug. 24, 1982, is seen as disclosing a single software package addressing plural accounting functions. However, the system of the '442 patent is seen as quite specific in its direction, i.e., to composite management of securities brokerage and cash management, and falls far short of encompassing the totality of banking transactions of a traditional institution. While the example under discussion has been banking-related, applicants' comments apply more generally to computer implementation of various business functions.

A further observation of applicants is that they see heretofore known computer implementation of commercial functions to be to be pre-ordained and largely invariant upon planning. Thus, the banking application software packages of assignee heretofore provided were of omnibus type, inclusive of all functions collective to all intended installations. The system of the '442 patent is likewise of pre-ordained configuration. From applicants' viewpoint, it would be highly desirable for a planner for an installation to ordain the contents of a system at its installation and to have capability for adding or modifying system functions.

SUMMARY OF THE INVENTION

The present invention has as its primary object the provision of improved digital data processing systems.

A more particular object of this invention is to provide an improved digital data processing system for use with an integrated data management system to enhance usage thereof in effecting computer implementation of diverse commercial functions.

It is a further object of the invention to provide an improved digital data processing system adapted for configuring the same according with a system planner's specifications at the time of system installation and subsequently as desired.

In attaining the foregoing and other objects, the invention provides a system for computer implementation of a plurality of diverse commercial functions, the system comprising a central processing unit (CPU), a first plurality of storage modules each individually addressable by the CPU and containing what will be termed a "component subprocess", and a second plurality of storage modules, each also individually addressable by the CPU and containing what will be termed a "log point". Planner interactive means are provided and furnished by the CPU from further storage of the system with menus for planning of what will be termed system "products". Such menus will present for selection various components which can be implemented. Responsively to planner component selection, for each component selected by the planner, the CPU responds by displaying the component processes associated with such component and the planner accumulates desired products by selecting component processes. Again from system storage, the CPU furnishes, for display and selection, system log points, which are predefined conditions in a component process which collect transaction information.

At the close of the planning phase, information is stored which is fully definitive of the system products, i.e., the name given each product by the planner, the component process providing the product, various disciplinary records in the nature of housekeeping for the institution as discussed hereinafter, and the log points for the product. The full accumulation of such stored information and associated physical structures (CPU, system storage, terminals, output devices) constitutes a system tailored to the needs of the institution by planner selection practices and decisions.

While the system of the invention has omnibus character in accumulating by planner selection component processes to build substantially any desired product, it has a further aspect whereby different products may employ different component processes, but can share the same component subprocesses, giving rise to uniformity in the practice of such shared component process from product to product. Preferably, the component subprocesses are stored individually and are combined by the CPU in various sequences to realize component processes.

The foregoing and other objects and features of the invention will be understood from the following detailed description of preferred embodiments and methods thereof and from the drawings wherein like reference numerals identify like parts and components throughout.

DETAILED DESCRIPTION OF PREFERRED EMBODIMENTS

Figure 1:
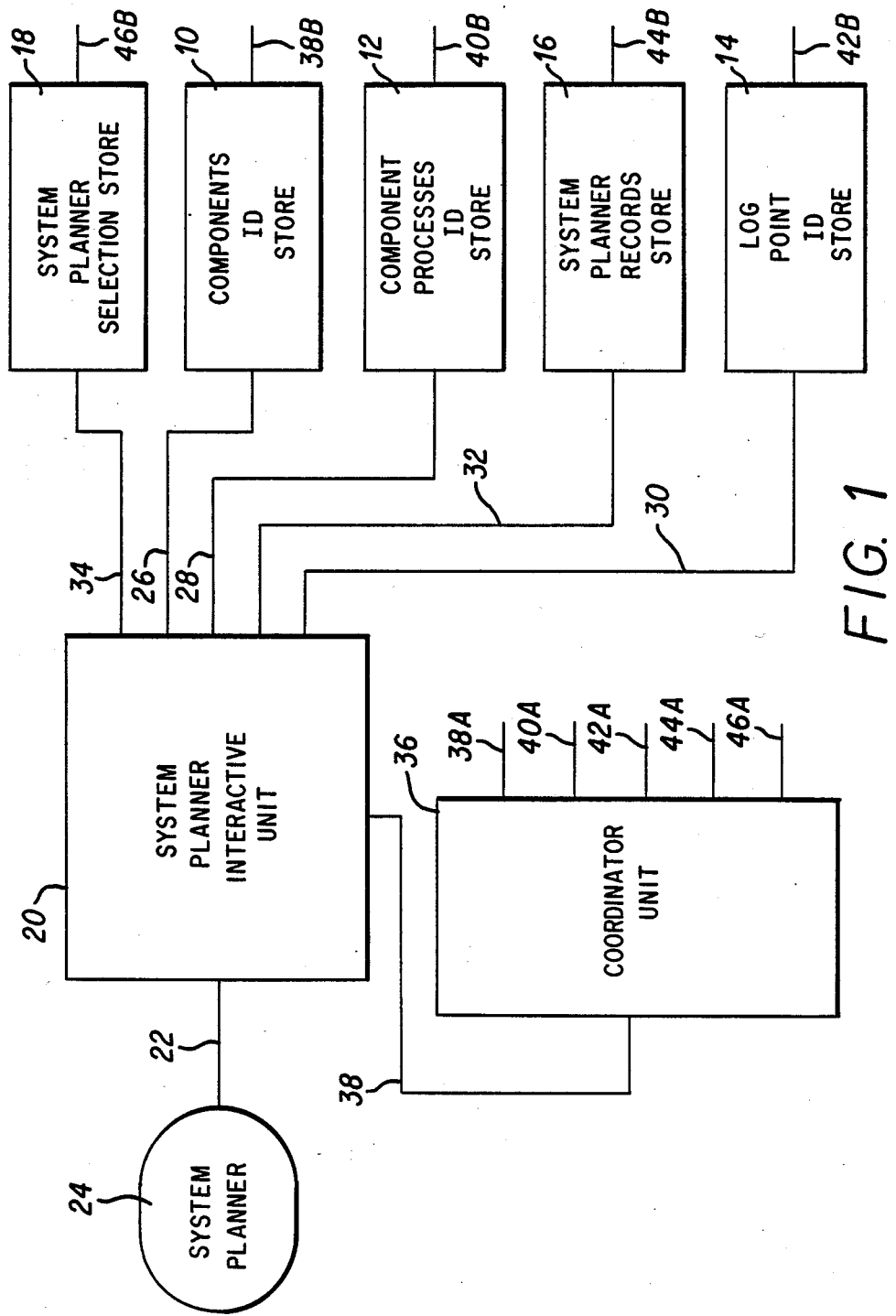
FIG. 1 is a block diagram of the system of the invention configured in its product planning phase.

The invention will be described particularly in the business function environment of banking and outset discussion will be had of certain terms and definitions and examples related thereto.

Component. The system may involve some thirty components, as follows: billing; credit line; currency exchange; delinquency; effective data; float; funds transfer; guarantee deposit; hold; inactivity; interest accrual; interest payment; IRA-Keogh; LIFO-FIFO; rate; rebate-payoff; reconciliation; service charge; special inquiry; third party; and withholding report. As will be seen below, a system component is a transitory entity, not being itself realized or created, but usable in creating system products.

Component Process. A component process is a step, the practice of which yields a result desired in reaching a product. Assuming a product of interest to a planner to include the billing component, the planner would select a component process associated with such component, which may comprise the following component processes: compute billing amounts; create receivables; extend payment; funds required; load overpayment; payment change, reverse payment; update payment change cycle; and waive a bill outstanding. Assuming the product of interest to a planner to include the credit line component, the planner would select from the following credit line component processes: account credit line; commercial credit line; commitment credit line; credit line review; letter of credit posting; and revolving credit line.

In this context, a common product class would be savings and a product thereunder would be passbook savings. To realize this product, component process selections would be made from those of plural components, namely, funds transfer, hold, interest accrual, interest payment, posting and passbook.

Component subprocess. A component subprocess is code for effecting a procedure which is a part of a component process. Examples (ACCUMULATE FLOAT, ACCUMULATE FLOAT, BALANCE CALCULATION) are covered below.

Log points. As above noted, log points are predefined conditions in a component process which collect transaction information, and may indicate log point destinations, such as the making of reports, the printing of notices, batch activity (ordering of checks or coupons), and general ledger entries. In large part, log points are indicative of the attainment of progress throughout the component process, such as verifying the finding of the records involved, the detection of IDMS/R errors, and like monitoring events.

Sources. These are the origins of transactions, for example, tellers, automatic teller machines (ATMs). The system is itself the source of various cyclical transactions, such as accounts active daily, daily receivables, daily interest accruals, etc.

Transactions. Transactions may be of three varieties. On line transactions would derive from tellers and ATMs and may involve the cashing or depositing of checks. Batch transactions involve such measures as ordering checks and coupons. Cyclical transactions, as above noted, are system as source matters.

Transaction control. This aspect of system activity involves identification of transaction sources, identification of transaction codes within each source, identification of products and assignment of transaction rules. In system operating discipline, transaction-source-product records are accessed by the CPU to obtain identification of component processes involved (this is indicated by the transaction code of such record as defined in product making), to identify the source and product and to apply transaction rules (valid and invalid amount, dates, limits, etc.).

Account groups. These are collections of accounts that share one or more attributes, thus establishing a relationship between accounts. Different products may belong to the same account group, such as a daily accrual cycle account group. An account group hierarchy exists and includes primary account groups, which are entered based on the component processes selected for products during product definition. Non-primary account groups are dependent on primary account groups and nested thereunder.

Model Records. These records, also termed junction records, connect an account to an account group and store information to open a new account or to process existing accounts. Each model record is associated with at least one component process. A model record is connected to an account group during definition of a product and a copy of the model record is connected to a new account when it is added.

As will be appreciated the matters of transactions, transaction controls, account groups and model records represent discipline within the system and effect housekeeping together with the IDMS/R. In the interests of simplification, these items are not discussed in great detail.

Turning from the above definitions of terms, and referring to FIG. 1, same shows a block diagram of the system in its product planning phase. Information stores 10, 12 and 14 contain digital signals indicative of literal legends to be presented to the system planner. Store 10 (COMPONENTS ID STORE) contains signals literally identifying the components of the system. Store 12 (COMPONENT PROCESSES ID STORE) contains signals literally identifying the component processes in recall groupings associated with the related component. Store 14 (LOG POINT ID STORE) contains signals literally identifying log points in recall groupings associated with the related component process. Two further stores are involved in FIG. 1, namely, 16 and 18. Store 18 (SYSTEM PLANNER RECORDS STORE) serves to store signals indicative of records accumulated during product definition. Store 18 (SYSTEM PLANNER SELECTION STORE) serves to store signals indicative of the various selection of the planner regarding product classes, product names, component processes and log points.

A terminal 20 (SYSTEM PLANNER INTERACTIVE TERMINAL), which may be constituted of a keyboard, CRT display and associated electronics, is provided for viewing and operation 22 by a SYSTEM PLANNER 24. Lines 26, 28, 30, 32 and 34 connect terminal 20 with stores 10, 12, 14, 16 and 18, respectively.

A COORDINATOR UNIT 36 coordinates activities of the remaining system components of FIG. 1 to practice various planning steps in manner discussed in connection with the flow chart of FIG. 2 below. Controller 36 is connected to terminal 20 by line 38 and to stores 10, 12, 14, 16 and 18 over lines 38A, 38B, 40A, 40B, 42A, 42B, 44A, 44B, 46A and 46B.

Figure 2:
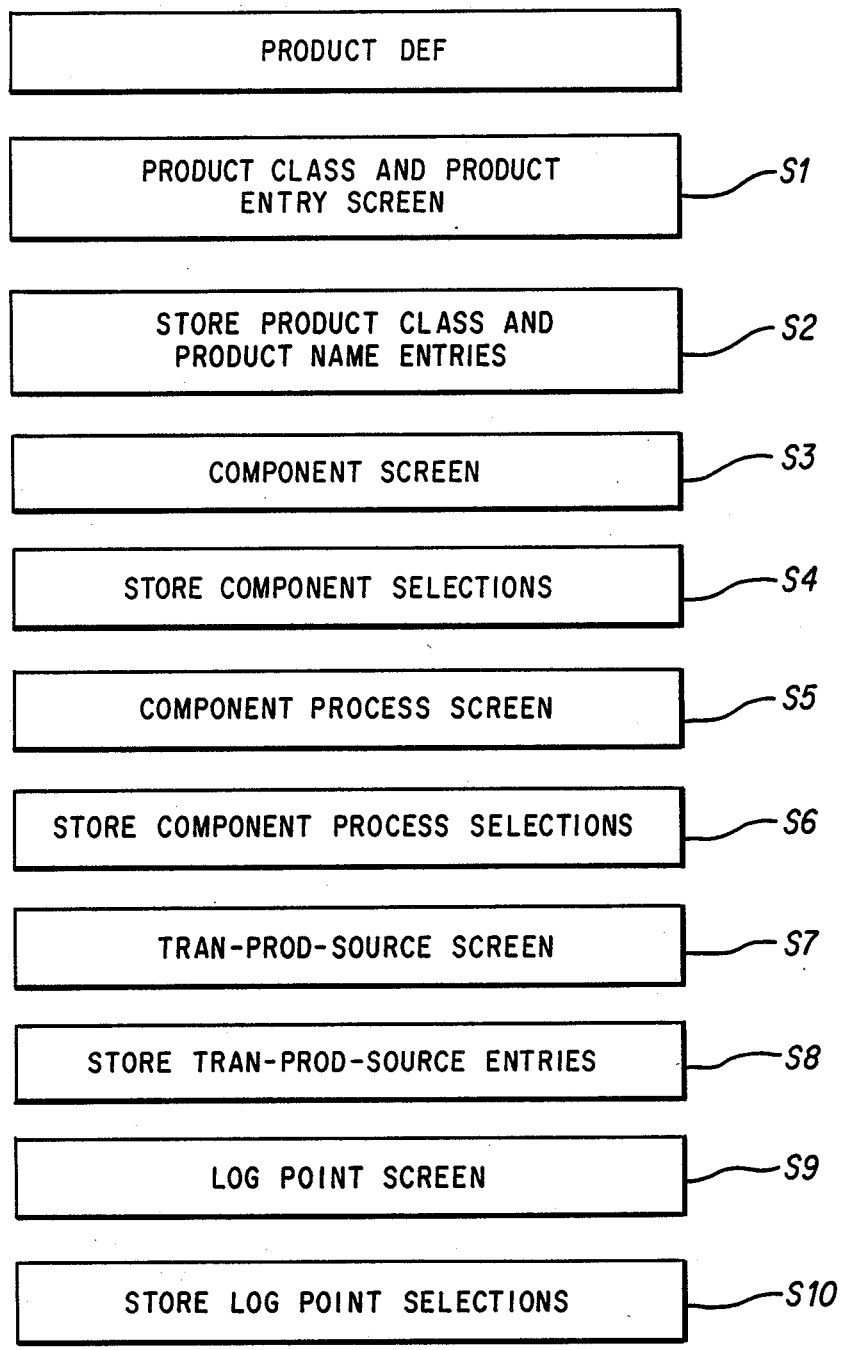
FIG. 2 is a flow chart indicative of system activity in the product planning phase.

Turning to FIG. 2, in product definition (PRODUCT DEF), coordinator unit 36 calls out an initial step S1 (PRODUCT CLASS AND PRODUCT ENTRY SCREEN), which presents a display on terminal 20 for planner entry of product class and product. By way of an example of planner response, the word "savings" might be entered as defining the product class and the word "regular savings" as defining the product. The entry provides for digital data signals to issue from terminal 20 on line 34 and step S2 (STORE PRODUCT CLASS AND PRODUCT NAME ENTRIES) effect storage in planner selection store 18. In step S3 (COMPONENT SCREEN), coordinator unit 36 calls out the contents of component identification store 10 for display by terminal 20. The above-enumerated components are accordingly presented on successive screens along with a selection column in which the planner may make entries correspondingly to the components seen to have applicability in the product being created. Digital signals issue from terminal 20 indicative of selected components and step S4 (STORE COMPONENT SELECTIONS) effects storage thereof in store 18.

Component processes are stored in groupings corresponding to components for recall in such groupings upon component selection. Recall thereof from store 12 and display on terminal 20 is effected in step S5 (COMPONENT PROCESS SCREEN). This display is as above described for component selection and the planner entries of component processes selected for the product are stored in store 18 in step S6 (STORE COMPONENT PROCESS SELECTIONS).

In step S7 (TRAN-PROD-SOURCE SCREEN), coordinator 36 presents a variety of selection screens to permit the planner to choose interrelation of transactions, products and sources, and to enter the applicable institutional disciplines above alluded to for storage in record store 16 in step S8 (STORE TRAN-PROD-SOURCE ENTRIES).

In step S9 (LOG POINT SCREEN), coordinator unit 36 accesses log point identification store 14 and calls for display by terminal 20 of log points and destinations for selection by the planner. Akin to interrelated storage of component processes in groups correlated with components, storage of log points is made in groupings for each component process. In step S10 (STORE LOG POINT SELECTIONS), coordinator unit 36 effects storage of planner log point selections in planner selection store 18.

The method of FIG. 2 is typically for practice at the time of system installation in an institution and may encompass the establishing of a wide variety of products or an individual product for study and evaluation over time. As will be appreciated, the system flexibility is such that the system planner may add a product to the already in place system by practice of the FIG. 2 method at any desired time. Further, a pre-existing product may be modified readily by programming coordinator unit 36 to recall the contents of stores 16 and 18 relating to such product and changing the structure of the product by altering its component processes and log points or modifying the institutional records.

At this juncture, it will be assumed that the method of FIG. 2 has been practiced for definition of numerous products and that the system thus tailored to the planner needs is to be operated by users, such as tellers, ATMs, the system as source, and others. The block diagram of FIG. 3 will facilitate an understanding of this usage phase.

Figure 3:
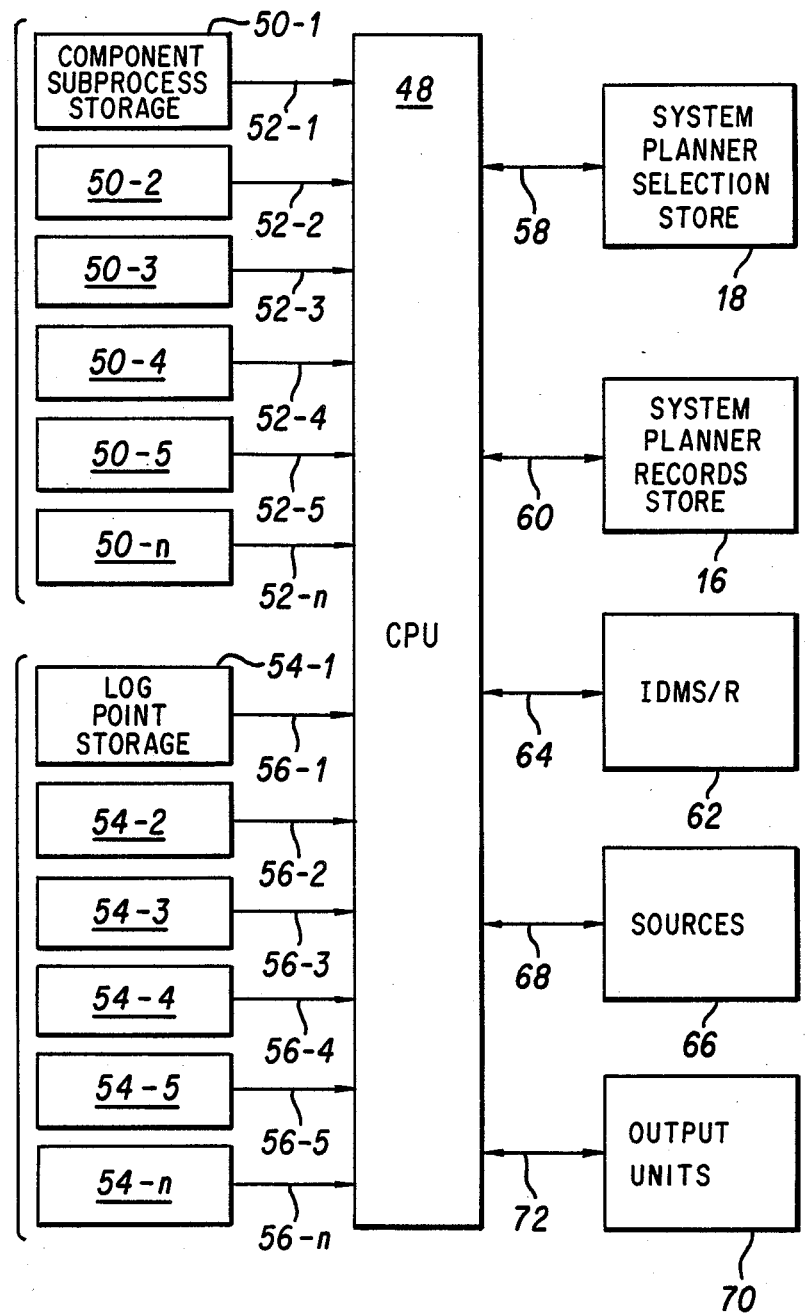
FIG. 3 is a block diagram of the system in its usage phase.

Central processor unit (CPU) 48 of FIG. 3 is suitably programmed to implement coordinator unit 36 of FIG. 1 and the various steps below stated for system usage. Component subprocess storage modules 50-1 through 50-n are connected to CPU 48 over lines 52-1 through 52-n for individual addressing thereof and individual recall of the stored subprocesses. Modules 50-1 through 50-n contain signals indicative of the operative steps of the component subprocesses therein, several of which are discussed in detail at a later stage herein.

Log point storage modules 54-1 through 54-n are connected to CPU 48 over lines 56-1 through 56-n and are individually addressable for content recall. Such log point modules differ from log point identification store 14 of FIG. 1 in containing signals indicative of log point specifications and destinations rather than mere literal identification of log points.

System planner selection store 18 and system planner record store 16 of FIG. 1 are connected to CPU 48 over lines 58 and 60.

IDMS/R 62 is connected to CPU 48 over line 64 and will typically include therein record store 16, such that all system data is in one site. Sources 66 are connected to CPU 48 over lines 68. Output units 70 are connected to the CPU over lines 72 and will include printers, teller terminals and the like.

In operation of the system of FIG. 3, sources 66 communicate transaction requests to CPU 48 and the CPU determines from store 16 the applicable parameters, particularly the transaction code. The CPU thereupon looks to store 18 for planner selected component processes and log points applicable to the transaction for the particular source at hand. The CPU then accesses component subprocess modules 50 and log point modules 54 to implement the transaction. Recourse is made to database 62 for account information, balances, etc., which have been entered in the course of new account openings.

Figure 4:
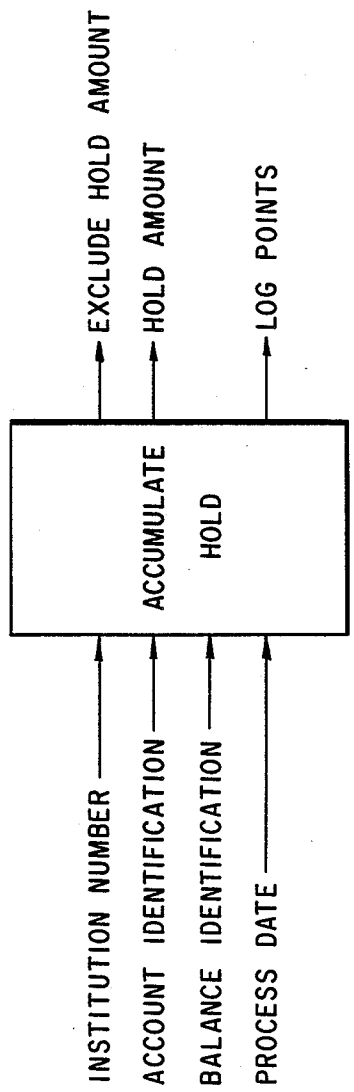
FIGS. 4 through 6 depict block diagrams of typical component process modules usable in the FIG. 3 system.
Figure 5:
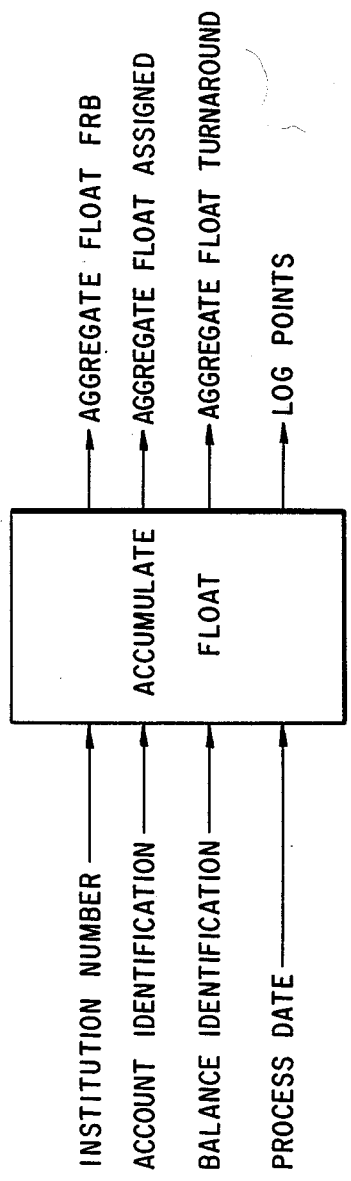
Figure 6:
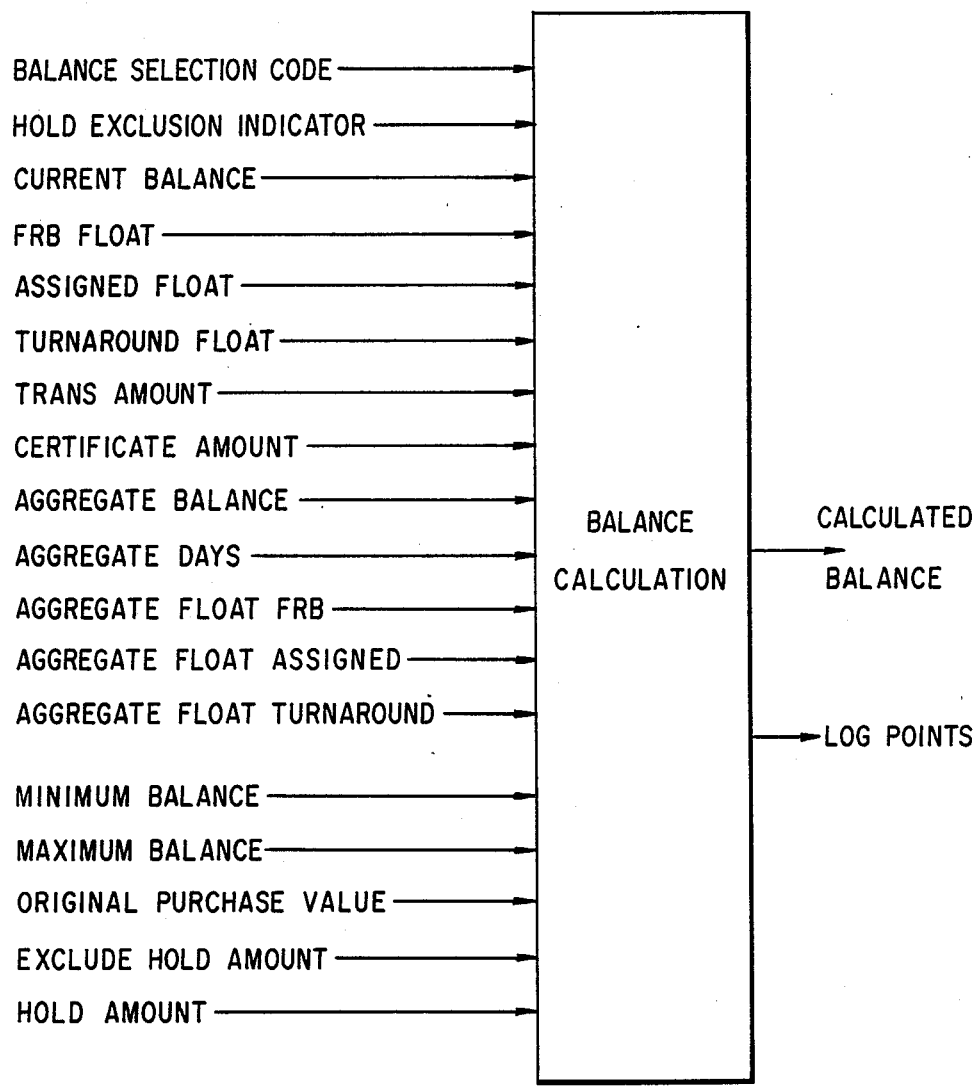

FIGS. 4 through 6 show three exemplary component subprocess modules derived by applicants for use in planning various products specifically for computer implementation of a full banking system. Considering FIG. 4, the ACCUMULATE HOLD subcomponent process has as its inputs the institution number, account identification, the balance presently identified for such account by the operative source and the process date. This module outputs, upon practice of the component subprocess on such input information, one of two results, namely, that the hold amount should be excluded from a transaction or that the hold amount should be applied to such transaction. The steps of the ACCUMULATE HOLD component subprocess are as follows.

a. Obtain the hold account and its first hold detail record.
b. If the hold account record is not found, exit from this module. (This is a log point output of this module.)
c. If there is a database error, log an error message and stop processing. (This is another log point output of this module.)
d. If the process date is not less than the effective date and the process date is not greater than the expiration date, and if the input balance identified is equal to the system stored balance, then advance to steps f. and g.
e. Obtain the next hold detail record and revert to step b.
f. If the account has correspondence with institutional reason codes and exclusion amounts for the account, add hold amount to the output hold amount.
g. If the account does not have correspondence with institutional reason codes and exclusion amounts for the account, subtract the hold amount from the output hold amount.

Considering FIG. 5, the ACCUMULATE FLOAT component subprocess has as its inputs the institution number, account identification, the balance presently identified for such account by the operative source and the process date. This module outputs, upon practice of the component subprocess on such input information, one of three results, namely, an aggregate float frb, an aggregate float assigned or an aggregate float turnaround.

The steps of the ACCUMULATE FLOAT component subprocess are as follows.

a. Obtain the float account and its first float detail record.
b. If the float record is found, (1) add the aggregate float frb to the output aggregate float, (2) add the aggregate float assigned, and (3) add the aggregate float collected to the output aggregate float turnaround.
c. If the float record is not found, exit from this module. (log point)
d. If the process date is less than the effective date or the process date is greater than the expiration date, or if the input balance identified is not equal to the system stored balance, then advance to step i.
e. If the float type code for the account is equal to a first assigned institutional code, add the float amount to the output frb float and output aggregate frb float.
f. If the float type code for the account is equal to a second assigned institutional code, add the float amount to output assigned float and output aggregrate float assigned.
g. If the float type code for the account is equal to a third assigned institutional code, add the float amount to the output turnaround float and output turnaround float.
h. If the float type code for the account is not equal to any of the first, second and third assigned institutional codes, log record and error message (log point) and stop processing.
i. Obtain the next float detail record and revert to step c.

Considering FIG. 6, the BALANCE CALCULATION component subprocess has as its inputs the balance selection code, hold exclusion indicator, current balance, frb float, assigned float, turnaround float, trans(action) amount, certificate amount, aggregate balance, aggregate days, aggregate float frb, aggregate float assigned, aggregate float turnaround, minimum balance, maximum balance, original purchase value, exclude hold amount and hold amount. This module outputs, upon practice of the component subprocess on such input information, the calculated balance.

The compound subprocesses of FIGS. 4 and 5 will be noted as being responsive to stored input data not derived from another component subprocess module and to function to provide diverse module output data from said input data. FIG. 6 indicates a further dimension of the invention and its flexibility and versatility. Here, it will be seen that input data to the BALANCE CALCULATION component subprocess module is inclusive of data derived from other modules, namely, the ACCUMULATIVE HOLD and ACCUMULATE FLOAT component subprocess modules and functions to provide still further diverse module output data.

The steps of the BALANCE CALCULATION component subprocess are as follows.

a. Initialization—calculated balance and error code are set to zero.
b. If the balance selection code is less than 1 or greater than 16, move 1 to error code. (log point)
c. If the hold exclusion indicator is not equal to Y and not equal to N, move 2 to error code. (log point)
d. If the error code is zero and the balance selection code is equal to 1, move the current balance to calculated balance.
e. Subtract the exclusion hold amount from the calculated balance. If the hold exclusion indicator is equal to Y, subtract the hold amount from the calculated balance.
f. If the error code is zero and the balance selection code is equal to 2, calculate and move frb collected to calculated balance. Do step e.
g. If the error code is zero and the balance selection code is equal to 3, calculate and move assigned amount to calculated balance. Do step e.
h. If the error code is zero and the balance selection code is equal to 4, calculate and move turnaround amount to calculated balance. Do step e.
i. If the error code is zero and the balance selection code is equal to 5, move the trans amount to calculated balance. Do step e.
j. If the error code is zero and the balance selection code is equal to 6, move the certificate amount to calculated balance. Do step e.
k. If the balance selection code is equal to 7 and aggregate days is zero, move 3 to the error code. If the error code is zero and the balance selection code is equal to 7, calculate and move the average current balance to calculated balance. Do step e.
l. If the balance selection code is equal to 8 and aggregate days is zero, move 3 to the error code. If the error code is zero and the balance selection code is equal to 8, calculate and move the average frb collected to calculated balance. Do step e.

m. If the balance selection code is equal to 9 and aggregate days is zero, move 3 to the error code. If the error code is zero and the balance selection code is equal to 9, calculate and move the average assigned to calculated balance. Do step e.

n. If the balance selection code is equal to 10 and aggregate days is zero, move 3 to the error code. If the error code is zero and the balance selection code is equal to 10, calculate and move the average turnaround to calculated balance. Do step e.

o. If the error code is zero and the balance selection code is equal to 11, calculate and move the minimum balance to calculated balance. Do step e.

p. If the error code is zero and the balance selection code is equal to 12, calculate and move the maximum balance to calculated balance. Do step e.

q. If the error code is zero and the balance selection code is equal to 13, move the original purchase value to calculated balance. Do step e.

r. If the error code is zero and the balance selection code is equal to 14, calculate and move the frb included to calculated balance. Do step e.

s. If the error code is zero and the balance selection code is equal to 15, calculate and move assigned float included to calculated balance. Do step e.

t. If the error code is zero and the balance selection code is equal to 16, calculate and move the turnaround float included to calculated balance. Do step e.

u. Exit from this module.

As will be seen from the above, following initialization, this component subprocess confirms propriety of the selection code as corresponding (1 through 16) to the asset account inputs to this module. The process then confirms that the hold exclusion indicator at hand at the input is not one of two institutional values (Y and N) which would represent error in use of this component subprocess. It then practices computational step e. in accordance with the actual selection code at hand. The component process thus comprises computational and log point activity and, as noted above, is in chain relation to other modules (ACCUMULATE HOLD, ACCUMULATE FLOAT) by CPU code corresponding to the component processes.

As will be understood by those in the banking field, the computational activities involved in accumulating holds and floats are common to various parent computational activities other than the calculation of balance, as in the above example of FIG. 6. Thus, the activities of accumulating holds and floats are performed in parent computational activities of computing accured interest. Indeed the component subprocess of FIG. 6 is itself used in computations of accured interest. Thus, under the invention, the very same component subprocess module may be used over and over in realizing component processes.

Figure 7:
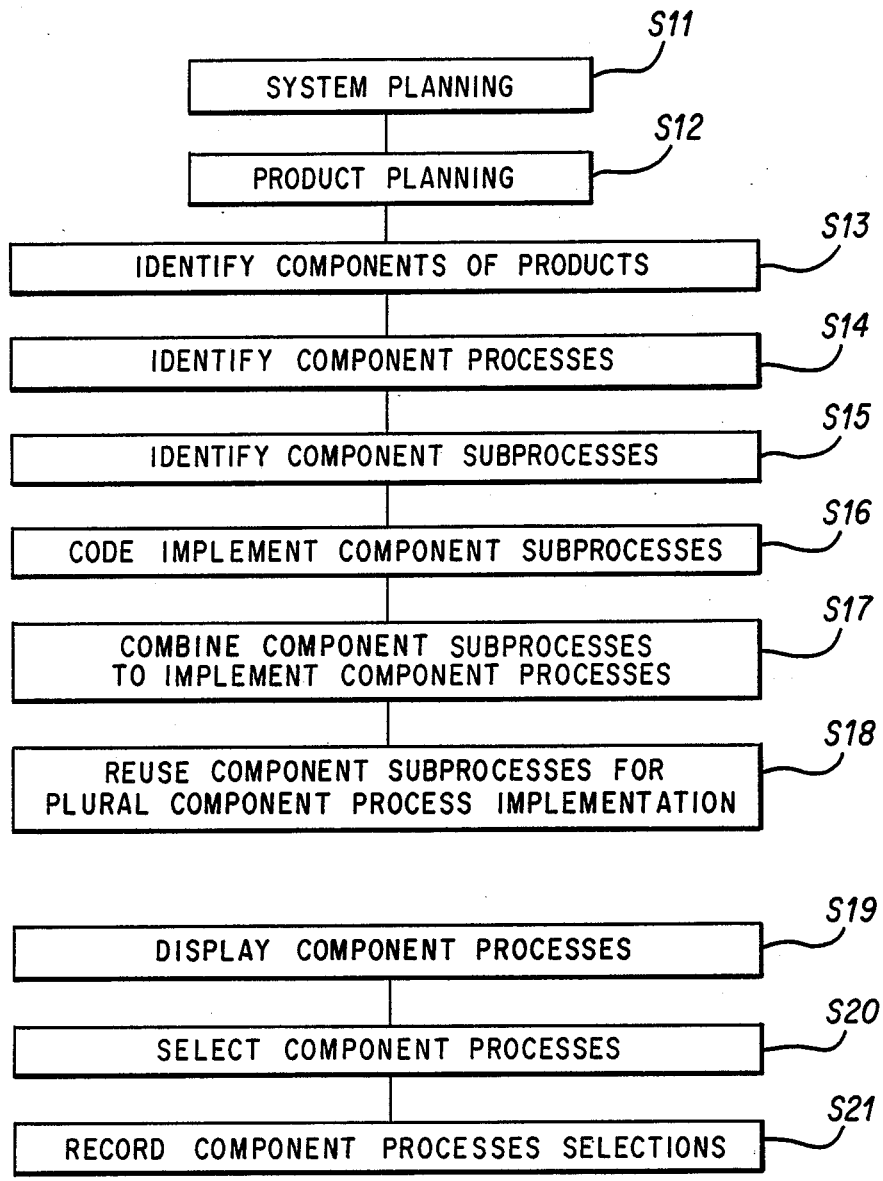
FIG. 7 is a flowchart providing an understanding of architecture parent to the system of the invention.

Beyond the foregoing, the architectur provided by the invention will be further understood from a consideration of the flow chart of FIG. 7. The ultimate step is that of step S11 (SYSTEM PLANNING), reached immediately by the step S12 (PRODUCT PLANNING). Step 13 (IDENTIFY COMPONENTS OF PRODUCTS) is a precursor to product planning. Step 14 (IDENTIFY COMPONENT PROCESSES) is a part of product planning. Steps S11 through S14 are reached by the system designer, typically through discussion of the systm designer, one skilled in systems analysis and code preparation, with the institutional planner, one presumed not to have these latter skills.

Step S15 (IDENTIFY COMPONENT SUBPROCESSES) is uniquely in the province of the system designer, as are step S16 (CODE IMPLEMENT COMPONENT SUBPROCESSES), step S17 (COMBINE COMPONENT SUBPROCESSES TO IMPLEMENT COMPONENT PROCESSES) and step S18 (REUSE COMPONENT SUBPROCESSES FOR PLURAL COMPONENT PROCESS IMPLEMENTATION).

Steps S19 (DISPLAY COMPONENT PROCESSES), S20 (SELECT COMPONENT PROCESSES) and S21 (RECORD COMPONENT PROCESS SELECTIONS) are uniquely in the province of the institutional planner, once the designer activity is completed.

Architecture or methodology underlying the invention will thus be seen as involving a first step of providing pluralities of first code (CPU code defining component processes) accessible to the instituational planner and thereby executable by such planner upon display and selection of component processess. A second step is that of providing pluralities of second code (component subprocess codes) inaccessible to the institutional planner and thereby non-executable by such planner, but accessible to the system designer and selectively combinable by such designer. In effect, applicants create a system adaptive to the presence and involvement of a planner in product making by the inclusion of some code selectively executable by the planner.

Various changes may be introduced in the foregoing system embodiment and modifications may be made to the described methods without departing from the invention. Thus, as noted, while the system and method are shown in specific application to the business environment of banking, they are of course applicable to other business functions. It is to be appreciated that the particularly disclosed and depicted preferred embodiment and practice is intended in an illustrative and not in a limiting sense. The true spirit and scope of the invention is set forth in the following claims.

What is claimed is:

1. In combination, in a system for computer implementation of business products:
   (a) a first signal store containing signals indicative of literal identification of component processes for said products;
   (b) a second signal store containing signals indicative of literal identification of log points for said component processes;
   (c) system planner interactive means for receipt of such stored signals from said first signal store and said second signal store, for display of said literal identifications of said component processes and said log points, and responsive to planner input for selection of said displayed identifications of both said component processes and said log points to define said products; and
   (d) a third signal store for storage of signals indicative of said planner selections of said displayed identifications.

2. The invention claimed in claim 1 further including a fourth signal store containing signals indicative of literal identifications of components of said products, said system planner interactive means being adapted for receipt of stored signals from said fourth signal store, for display of said literal identifications of said components, and responsive to planner input for selection of said displayed identifications of said components.

3. The invention claimed in claim 2 further including coordinator means for effecting signal receipt by said system planner interactive means successively of signals from said fourth store, said first store and said second store whereby planner selection is made of said components, said component processors and said log points successively.

4. The invention claimed in claim 2 wherein said second signal store contains said log point indicative signals in groupings corresponding with respective ones of said component processes and wherein said first signal store contains said component process indicative signals in groupings corresponding with respective ones of said components.

5. The invention claimed in claim 1 wherein said second signal store contains said log point indicative signals in groupings corresponding with respective ones of said component processes.

6. In combination, in a system for computer implementation of business products having components realized by component processes:
 (a) component subprocess storage means for storing signals indicative of the steps of component subprocesses of said component processes;
 (b) log point storage means for storing signals indicative of log points of said component processes; and
 (c) processor means connected to said component subprocess storage means for selectively obtaining therefrom stored signals indicative of the steps of subcomponent process and connected to said log point storage means for selectively obtaining therefrom stored signals indicative of log points, said processor means implementing said products in accordance with said obtained signals.

7. The invention claimed in claim 6 wherein said component subprocess storage means comprises a plurality of storage modules, each containing signals indicative of a distinct said component subprocess, each such component subprocess storage module being separately addressable by said processor means for obtaining said contained signals thereof.

8. The invention claimed in claim 7 wherein said log point storage means comprises a plurality of storage modules, each containing signals indicative of one of said log points, each said log point storage module being separately addressable by said processor means for obtaining said contained signals thereof.

9. The invention claimed in claim 8 wherein said processor means is operative in implementing diverse ones of said products to address said component subprocess storage modules in respective different combinations and to address said log point storage modules corresponding with log points called for in said addressed component subprocess storage modules.

10. The invention claimed in claim 9 wherein said processor means is further operative in implementing selective of said products by so addressing said component subprocess storage modules that a result obtained by practice of the component subprocess of a first addressed component subprocess storage module is used as an input for practice of the component subprocess of a second addressed component subprocess storage module.

11. In combination, in a system for computer implementation of business products realized by component processes and component subprocesses:
 (a) a first signal store containing signals indicative of literal identification of component processes for said products;
 (b) a second signal store containing signals indicative of literal identification of log points for said component processes;
 (c) system planner interactive means for receipt of said stored signals from said first signal store and said second signal store, for display of said lateral identifications of said component processes and said log points, and responsive to planner input for selection of said displayed identifications of both said component processes and said log points to define said products;
 (d) a third signal store for storage of signals indicative of said planner selections of said displayed identifications;
 (e) component subprocess storage means for storing signals indicative of the steps of said component subprocesses;
 (f) log point storage means for storing signals indicative of said log points; and
 (g) processor means connected to said component subprocess storage means for selectively obtaining therefrom stored signals indicative of the steps of component subprocesses, connected to said log point storage means for selectively obtaining therefrom stored signals indicative of log points, and to said third signal store for selectively obtaining therefrom stored signals indicative of said planner selections said processor means implementing said products in accordance with said obtained signals.

12. The invention claimed in claim 11 wherein said component subprocess storage means comprises a plurality of storage modules, each containing signals indicative of a distinct component subprocess, each said component subprocess storage module being separately addressable by said processor means for obtaining said contained signals thereof.

13. The invention claimed in claim 12 wherein said log point storage means comprises a plurality of storage modules, each containing signals indicative of one of said log points, each said log point storage module being separately addressable by said processor means for obtaining said contained signals thereof.

14. The invention claimed in claim 13 wherein said processor means is operative in implementing diverse ones of said products to address said component subprocess storage modules in respective different combinations and to address said log point storage modules corresponding with log points called for in such addressed component subprocess storage modules.

15. The invention claimed in claim 13 wherein said processor means is further operative in implementing selective of said products by so addressing said component subprocess storage modules that a result obtained by practice of the component subprocess of a first addressed component subprocess storage module is used as an input for practice of the component subprocess of a second addressed component subprocess storage module.

16. A method for use in computer implementation of business products, comprising the steps of:

(a) providing a product planner interactive terminal having a display screen and planner input capability;
(b) predefining components of said products, component processes for realizing said components and diverse conditions in said component processes for collecting information obtained at different times in said component processes;
(c) displaying on said screen identification of said components for planner selection and noting input by said planner of selections of said components;
(d) for each such noted component selection input, displaying on said screen identification of component processes for realizing said component and noting input by said planner of selections of said component processes;
(e) for each such noted component process selection, displaying on said screen identification of said diverse conditions and noting input by said planner of selections of said diverse conditions; and
(f) recording signals indicative of said selections of said planner of component processes and diverse conditions for defining each such product.

* * * * *